United States Patent [19]

Misaka et al.

[11] Patent Number: 4,597,537
[45] Date of Patent: Jul. 1, 1986

[54] VERTICAL MILL

[75] Inventors: Takaaki Misaka, Tokyo; Takeshi Furukawa, Kawasaki; Eiichi Onuma; Hiroshi Obana, both of Narashino; Kyosuke Fukuyama, Ichikawa; Toshiyuki Tanaka, Ashiya; Hiroyuki Murata; Katuhiko Shimojima, both of Kobe, all of Japan

[73] Assignees: Onoda Cement Company, Ltd., Onoda; Kohe Steel, Ltd., Kobe, both of Japan

[21] Appl. No.: 529,687

[22] Filed: Sep. 6, 1983

[30] Foreign Application Priority Data

Sep. 14, 1982 [JP] Japan ............................. 57-158857
Dec. 3, 1982 [JP] Japan ............................. 57-211251
Dec. 3, 1982 [JP] Japan ............................. 57-211252

[51] Int. Cl.$^4$ ..................... B02C 15/00; B02C 23/32
[52] U.S. Cl. ................................. 241/79.1; 241/119
[58] Field of Search ............. 241/152 A, 79.1, 52, 241/57, 58, 117–122; 209/144, 148, 154

[56] References Cited

U.S. PATENT DOCUMENTS 2,909,330 10/1959 Hardinge ..................... 241/58 X
3,951,347 4/1976 Tiggesbaumker et al. ...... 241/119 X
4,084,754 4/1978 Brundiek ..................... 241/119 X
4,296,864 10/1981 Misaka et al. ................. 209/144

FOREIGN PATENT DOCUMENTS 852350 8/1981 U.S.S.R. ..................... 241/119

Primary Examiner—Mark Rosenbaum
Attorney, Agent, or Firm—Nies, Webner, Kurz, & Bergert

[57] ABSTRACT

A vertical mill for material such as cement raw materials, clinker, coal, or the like comprises a grinder portion which has rollers arranged to grind the material by their rolling on a rotary table, a separator means which is positioned above the grinder portion and which classifies the ground material conveyed pneumatically from the grinder portion to the separator means by the two opposite forces of centrifugal force of a rotary disk and of fluid resistance of a vortex flow, a plurality of straightening vanes which are mounted between the casing and the inner cone and which adequately regulate the direction of the fluid in the lower portion and in the upper portion in passage between the grinding portion and the separator means, and a casing outside the separator means having the appropriate shape for forming a horizontal vortex flow in the separator means. The aforesaid vertical mill structure improves the classifying efficiency of the separator means.

3 Claims, 3 Drawing Figures

VERTICAL MILL

BACKGROUND OF THE INVENTION

The present invention relates to a vertical mill for such material as cement raw materials, clinker, coal, or the like, provided with a separator.

Generally, various vertical mills have been devised heretofore in order to grind a feed material such as cement raw materials or clinker, and to classify the powdered or granular material of the desirable particle size range from the ground material in one operation. For example, a conventional vertical mill comprises a grinder portion disposed at the bottom of a vertical cylindrical casing, and a separator means positioned above the grinder portion. The separator means has a shaft arranged to be rotatable along the center axis of the cylindrical casing. An impeller is mounted to the lower end of the shaft so that it may be rotated with the shaft.

In such a conventional mill, the ground material is conveyed by an upward moving fluid such as hot gas from the grinder portion to the separator means, and the powdered or granular material of a desirable particle size range is sorted out by the centrifugal force of a rotating impeller. Then, the finer particles are pneumatically conveyed to a suitable extraction conduit which is mounted on the top of the casing, and the coarser particles are radiated outward from the separator means.

However, in such a conventional vertical mill, these coarse particles rejoin the ground material being conveyed from the grinder portion to the separator means, and are returned into the separator means once more, without being conveyed back to the grinder portion. Therefore, as these coarse particles are not reground, the grinding efficiency in this type of mill is low.

An approach to such a problem is to provide a separator means which classifies the ground material by two forces i.e. by the fluid resistance of a vortex flow and by centrifugal force, and to partition this separator means and the grinder portion by a funnel-type inner cone in order to prevent the classified coarse particles from re-joining the ground material being conveyed upward and to positively return the classified coarse particles into the grinder portion, which improves the classifying the grinding efficiencies. However, in large-sized vertical mills, it is normally difficult to generate in a separator chamber an ideal horizontal vortex flow having the required gradient, which is indispensable for ideal classification. Therefore, it has been proposed to mount a plurality of adjusting plates for vortex flow on a rotary disk in the separator means so as to allow the gradient of the vortex flow to be adjusted precisely, and to divide the separator chamber into a plurality of separator chambers by at least one dashboard mounted to the adjusting plates to restrain the fluctuation or displacement of the longituditional component of velocity of the vortex flow.

However, as this kind of vertical mill has a structure where the fluid flow is spirally removed from the grinder portion up to the separator means, it is difficult to generate the ideal horizontal vortex flow in the separator means, even after the above-mentioned improvement. Further, the separator means which generates the vortex flow as mentioned above accelerates the revolution of the rising flow, which increases pressure loss. Additionally cyclone effect makes the ground material which has once been blown up with the rising flow to fall down along the inner wall of the casing, where the material is again blown up with the rising flow so that, accordingly energy is wasted.

SUMMARY OF THE INVENTION

It is therefore the general purpose of the present invention to provide a vertical mill which avoids all of the above-mentioned problems.

It is another object of the present invention to provide a vertical mill in which the diameter of the casing of the separator means becomes smaller at its upper portions so as to smoothly modify a rising and rotating fluid flow into a horizontal rotating flow, thereby becoming capable of making an ideal horizontal vortex flow to improve the classifying efficiency of the separator means.

It is a further object of the present invention to provide a vertical mill including a plurality of straightening vanes between the inner cone and the inner wall of the casing, the vanes restraining the revolution of the fluid flow rising from the grinder portion to the separator means, thereby preventing a repetitive cycle of the cyclone effect making the ground material once blown up with the rising flow to fall down and then to be blown up with the rising flow again, the prevention of which allows the efficient use of energy.

It is yet another object of the present invention to provide a vertical mill in which the lower portion of the straightening vane is mounted vertically and its upper portion is mounted at an approprivate angle in relation to a vertical axis, thereby shifting the fluid flow in an inlet of the separator means smoothly into the horizontal vortex flow needed for classifying while maintaining the above-mentioned efficiency thereby improving the classifying efficiency.

It is a further object of the present invention to provide a vertical mill in which at least one secondary fluid conduit is mounted so that it can form a more ideal horizontal vortex flow and that it can control the flow rate of fluid rising from the grinder portion to the separator means at a suitable level, also improving the classifying efficiency.

It is a still further object of the present invention to provide a vertical mill in which a tertiary fluid conduit is mounted so that it can disperse the ground material smaller than a classifying point adhered to the coarse particles in the inner cone and then carry up to the separator chamber to classify the ground material again, thereby the classifying efficiency.

Other objects and advantages of the present invention will become apparent from the following description of embodiments with reference to the accompanying drawing.

BRIEF DESCRIPTION OF THE DRAWINGS

The invention is illustrated disgrammatically in the following drawings wherein.

DESCRIPTION OF THE INVENTION

Figure 1:
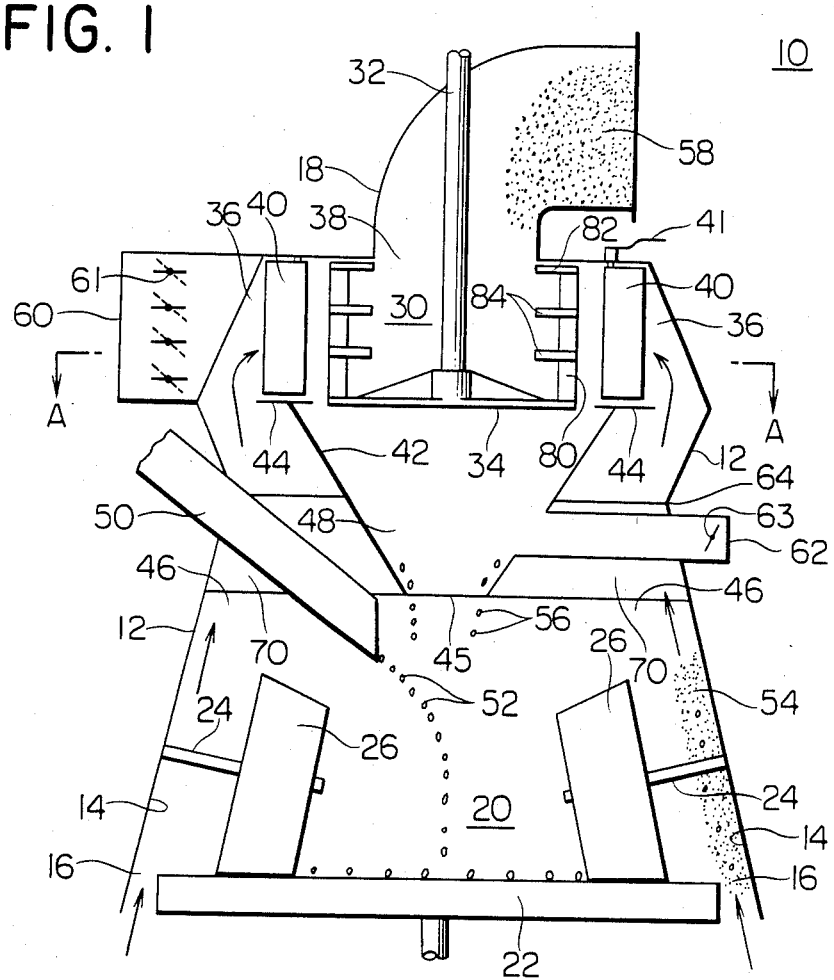
FIG. 1 is a vertical sectional view of a vertical mill according to the first preferred embodiment of the invention.
Figure 2:
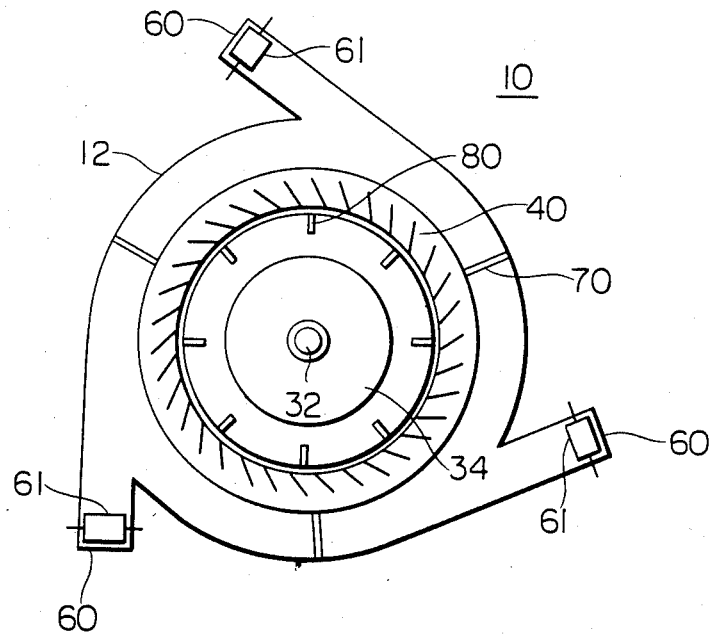
FIG. 2 is a sectional view taken along the line A—A in FIG. 1.

In the exemplary embodiment of the invention as disclosed in FIG. 1, a vertical mill 10 includes a grinder portion 20 and a separator means 30 in a vertical casing 12. The grinder portion 20 of the vertical mill 10 comprises a rotary table 22 which is disposed in the lower opening of the casing 12 so as to rotate horizontally, and a plurality of rollers 26 which are respectively supported by shafts 24 so as to roll on the upper surface of the rotary table 22. Each of the rollers 26 may be inclined inward. A feed material 52 is supplied from a feed chute 50 passing through the casing 12 to the general center of the rotary table 22, and is ground by the relative motion between the rollers 26 and the rotary table 22. The ground material 54 is thrown against the inner wall 14 of the casing 12 by the centrifugal force of rotary table 22. A gap 16 is formed between the inner wall 14 of the casing 12 and the surrounding surface of the rotary table 22, from which the upward moving fluid such as hot gas, coming in through the bottom of the mill, picks up and upwardly carries the ground material 54. The separator means 30 is positioned at the upper part of the casing 12. The diameter of the casing 12 gradually becomes narrower from the lower end of the grinder portion 20 to a level 64, and again becomes broader from the level 64 to the level corresponding to the lower end of the separator means 30. The level 64 is disposed at a portion generally midway between the lower end of the separator means 30 and the lower end of the inner cone 42 as described hereinafter. And at the outside of the separator means 30, the casing 12 gradually becomes narrower from the lower end to the upper end. The separator means 30 comprises a vertical shaft 32 arranged to be along the center axis of the casing 12 through a powder extraction conduit 18 which is mounted on the center opening of the top surface of the casing 12, a rotary disk 34 for classifying and dispersion which is mounted to the lower end of the shaft 32, guide vanes 40 to lead the fluid to the separator chamber 38 which is formed on top of the disk 34, and an inlet 36 for the fluid having the ground material 54 which is formed around the guide vanes 40. The rotary disk 34 the upper surface of which may slope outwardly and downwardly for smooth classification and dispersed, also prevents the accumulation of powdered material after classifying. A plurality of adjusting plates 80 are vertically mounted on the rotary disk 34 and are fixed to an annular rotary plate 82 above the rotary disk 34. The separator chamber 38 is divided into a plurality of separator chambers by at least one dashboard 84 mounted to the adjusting plates 80. The upper end plate 44 of a funnel-type inner cone 42 is disposed at the same level as the lower surface of the rotary disk 34. The inner cone 42 makes the interior of the casing 12 into a double-pipe structure, and thereby forming by the outside of cone 42 a powder passage 46 from the grinder portion 20 to the inlet 36, and by the inside forming a chute 48 for the coarse particles 56. The slope of inner cone 42 is more gentle than that of the casing 12 surrounding it. The lower opening 45 of the cone 42 is disposed perpendicularly above the center of the rotary table 22. A plurality of straightening vanes 70 are mounted between the inner cone 42 and the inner wall 14 of the casing. Referring to FIG. 2, a plurality of guide vanes 40 are mounted equally spaced in a concentric circle around the verticle shaft 32 and the rotary disk 34, so that their angle can be freely adjusted by a level 41 at the upper surface of the casing 12. Referring to FIG. 2, a secondary fluid conduit 60 for adjusting the flow rate of fluid sent to the separator means 30 may be tangentially mounted on the casing 12 around the separator. Further, a tertiary fluid conduit 62 for increasing classifying efficiency may be mounted on the inner cone 42 through the casing 12. Numerals 61, 63 designate dampers which are respectively attached at the secondary and tertiary fluid conduits 60, 62 so that they can adjust flow rate.

The operation of the vertical mill 10 as illustrated in FIG. 1 will now be explained. First of all, a product line (not shown) such as a ventilator or a product collector is connected to the extraction conduit 18, and along with creating a negative pressure in the casing 12 by its starting, at the same time, fluid such as air, cooling air, hot gas, or the like is blown up through the gap 16 into the casing 12. In turn, both the vertical shaft 32 and the rotary disk 34 are rotated by a suitable driving means (not shown), and simultaneously the rotary table 22 and the rollers 26 in the grinder portion 20 are rotated and thereby the operation of the mill 10 commences. The feed material 52 is supplied to the upper surface of the rotary table 22 through the feed chute 50. This feed material 52 is ground between the table 22 and the rollers 26 and is thrown outward by the centrifugal force of the rotary table 22. This ground material 54 is blown upwards by the fluid flow from the gap 16, and is conveyed to the upper inlet 36 through the powder passage 46 along the inner wall 14 of the casing 12. By virtue of straightening vanes 70, the fluid flow ascending from the grinder portion 20 gradually, loses its horizontal component of movement, which suppresses the cyclone effect of whirling fluid and so making it easier for the ground material 54 to be carried up into the separator means 30.

Since the passage 46 becomes narrower the higher the position and also since the upper part of the casing 12 is inclined inwardly, the ascending fluid flow from the grinder portion 20 smoothly turns its direction again into a genuine horizontal vortex flow without any disturbance in the vertical direction. Then, the fluid flow with the ground material 54 flows into the separator chamber 38 from the inlet 36, while forming a vortex flow by the guide vanes 40 which are set at a suitable angle. The adjusting plates 80 reduce the turbulence in the vortex flow, and still more the dashboard 84 prevents various undesirable effects caused by the fluctuation or displacement in the vertical direction of the particles in the vortex flow. These adjusting plates are positioned on the rotary disk 34 in a suitable position and at a suitable angle, in consideration of the desired classifying point, size of separator means 30 in the vertical mill 10, the rate of rotation of rotary disk 34, and the like. Also, the number of separator chambers 38 which are divided by the dashboard 84 may be settled by the size of original separator chamber 38 with regard to a desired classifying point and classifying accuracy. Now, if a secondary fluid conduit 60 is provided, when a suitable flow velocity cannot be attained because of a small flow rate, or when the amount of ground material to fluid is too great, the supplementary flow rate of fluid such as air, cooling air, hot gas, or the like from the secondary fluid conduit 60 can be adjusted. The fluid with the ground material which forms a vortex and flows into the separator chamber 38 has its rotary stream reinforced by rotation of the disk 34, and is simultaneously effected by two opposite forces of the outward centrifugal force and the inward fluid resistance. The diameter of a ground particle which is in a balanced condition between these two forces is called the classifying point. The ground materials of a smaller particle size range than the classifying point, i.e. fine particles are effected by the fluid resistance more than the outward centrifugal force and are conveyed towards the center with the fluid flow and then led to the product line through the extraction conduit 18. On the other hand, the ground material of a larger particle size range than the classifying point, i.e. coarse particles 56 are effected by the centrifugal force more than the fluid resistance, and flow along the inside of the guide vanes 40, and in turn fall to the inner cone 42. In the inside of the cone 42, if the tertiary fluid conduit 62 is mounted on the cone 42, fluid such as hot gas which is sent from said conduit 62 disperses and carries up fine particles adhered to the coarse particles 56 in the cone 42 so that the fine particles can be classified again. The classified coarse particles 56 fall down from the lower opening 45 of the cone 42 to the upper surface of the rotary table 22, and are reground as mentioned above.

Figure 3:
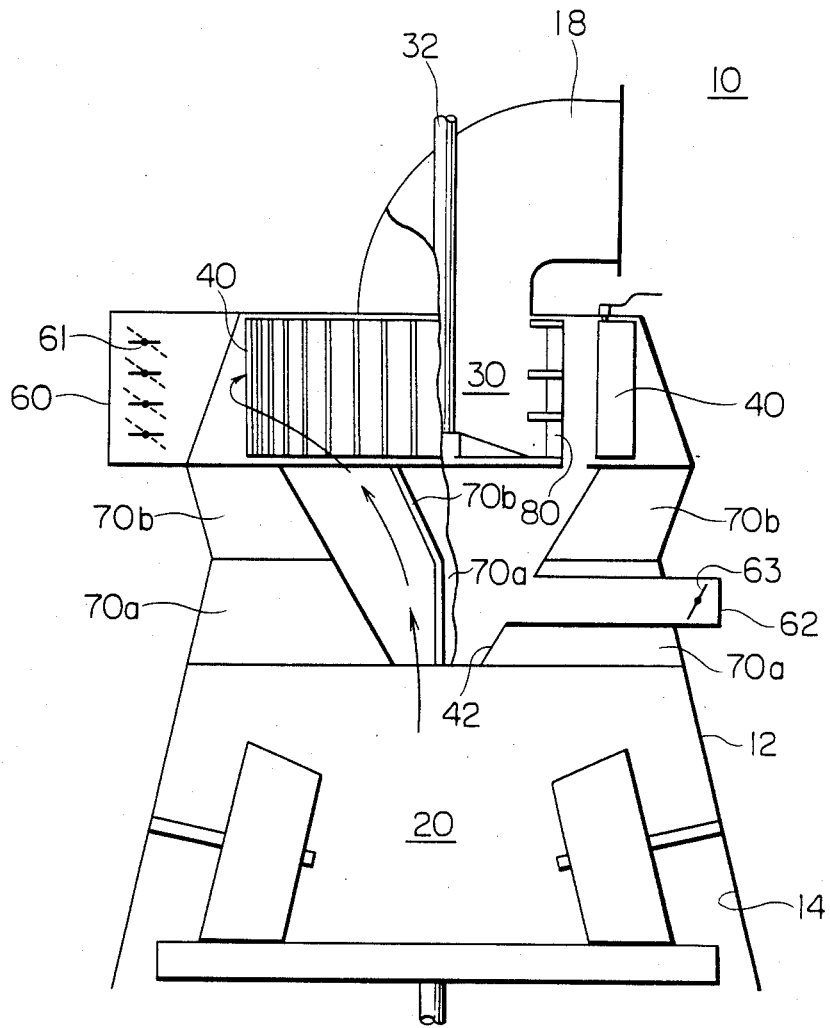
FIG. 3 is a vertical sectional view of a vertical mill according to the second preferred embodiment of the invention.

FIG. 3 shows another embodiment of the invention, in which the primary straightening vanes 70a are vertically mounted in order to prevent the fluid from rotating in this area, and the secondary straightening vanes 70b are mounted at an angle measured from the upper end of the primary straightening vanes 70a suitable for quickly forming a horizontal vortex flow needed for classifying. These straightening vanes 70a and 70b can form the more ideal horizontal vortex flow so that the classification will become more perfect.

It will be appreciated that modifications may be made in this invention. Accordingly, it should be understood that we intend to cover by the appended claims all modifications falling within the true spirit and scope of this invention.

What is claimed is:

1. A vertical mill for material such as cement raw materials, clinker, coal, or the like, comprising: a casing; a grinder portion, positioned in a lower part of said casing having a rotary table horizontally rotatable, and a plurality of rollers adapted to roll on an upper surface of said rotary table and to grind said material; and a separator means positioned above said grinder portion having an extraction conduit for fine particles mounted on the top center of said casing, a rotary disk being horizontally rotatable which is mounted to the lower end of a rotary vertical shaft extending perpendicularly through said extraction conduit, a plurality of guide vanes disposed vertically around said rotary disk, an inlet formed to surround said guide vanes, a plurality of adjusting plates vertically mounted on said rotary disk, a separator chamber formed inside of said rotary disk and of said guide vanes and of the top surface of said casing, at least one dashboard horizontally mounted to said adjusting plates so that said dashboard may divide said separator chamber into a plurality of separator chambers, and a funnel-type inner cone whose broader upper end is positioned at the underside of said inlet and whose narrower lower end is positioned above the center of said rotary table; and a plurality of straightening vanes each with lower and upper portions mounted between said casing and said inner cone; and characterized in that the diameter of said casing becomes gradually smaller from the lower end level of said separator means towards the upper end level of said separator means and the lower portion of each of said straightening vanes being vertically disposed and the upper portion of each of said straightening vanes being inclined relative to said lower portions of the straightening vanes at an angle measured from the upper end of said lower portions, between said casing and said inner cone.

2. The vertical mill as claimed in claim 1, characterized in that a secondary fluid inlet conduit is tangentially mounted on the upper part of said casing.

3. The vertical mill as claimed in claim 2, characterized in that a tertiary fluid conduit is mounted on said inner cone.

* * * * *

UNITED STATES PATENT AND TRADEMARK OFFICE
CERTIFICATE OF CORRECTION

PATENT NO.   :   4,597,537
DATED        :   July 1, 1986
INVENTOR(S)  :   Takaaki Misaka et al It is certified that error appears in the above-identified patent and that said Letters Patent is hereby corrected as shown below:

On the cover sheet of the patent, correct the name of the second assignee to read --Kobe Steel, Ltd.--.

Column 1, line 46, change "the" to --and--.

Column 2, line 52, after "thereby" insert --improving--.

Column 3, line 68, change "level" to --lever--.

Signed and Sealed this

Seventh Day of October, 1986

[SEAL]

*Attest:*

DONALD J. QUIGG

*Attesting Officer*   *Commissioner of Patents and Trademarks*